United States Patent
Takagi et al.

(10) Patent No.: US 12,527,338 B2
(45) Date of Patent: Jan. 20, 2026

(54) NON-ALCOHOLIC BEER TASTE BEVERAGE

(71) Applicant: SUNTORY HOLDINGS LIMITED, Osaka (JP)

(72) Inventors: Risa Takagi, Soraku-gun (JP); Saiko Sudo, Soraku-gun (JP); Keiko Iwasa, Soraku-gun (JP); Masaaki Ozawa, Soraku-gun (JP); Naoto Kanda, Soraku-gun (JP); Yoshihide Matsuo, Soraku-gun (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 414 days.

(21) Appl. No.: 18/013,935

(22) PCT Filed: Jun. 29, 2021

(86) PCT No.: PCT/JP2021/024556
§ 371 (c)(1),
(2) Date: Dec. 30, 2022

(87) PCT Pub. No.: WO2022/004722
PCT Pub. Date: Jan. 6, 2022

(65) Prior Publication Data
US 2024/0041070 A1 Feb. 8, 2024

(30) Foreign Application Priority Data
Jul. 1, 2020 (JP) ................................. 2020-114426

(51) Int. Cl.
A23L 2/56 (2006.01)
A23L 2/38 (2021.01)
A23L 2/66 (2006.01)

(52) U.S. Cl.
CPC .................. *A23L 2/56* (2013.01); *A23L 2/38* (2013.01); *A23L 2/66* (2013.01)

(58) Field of Classification Search
CPC ................. A23L 2/56; A23L 2/38; A23L 2/66
See application file for complete search history.

(56) References Cited

U.S. PATENT DOCUMENTS

| 4,957,767 A | 9/1990 | Maria de Kort et al. |
| 2020/0032180 A1 | 1/2020 | Shinkai et al. |
| 2023/0048747 A1 | 2/2023 | Iwasa et al. |

FOREIGN PATENT DOCUMENTS

| JP | H01-165358 A | | 6/1989 | |
| JP | 2003-250503 A | | 9/2003 | |
| JP | 2011254731 A | * | 12/2011 | ............... A23L 2/00 |
| JP | 2013-201976 A | | 10/2013 | |
| JP | 2014-082976 A | | 5/2014 | |
| JP | 2015-027309 A | | 2/2015 | |
| JP | 5746833 B2 | | 7/2015 | |
| JP | 2015-223140 A | | 12/2015 | |
| JP | 2016-123400 A | | 7/2016 | |
| JP | 2016-149975 A | | 8/2016 | |
| JP | 2020-103207 A | | 7/2020 | |
| JP | 2020-103208 A | | 7/2020 | |
| WO | 96/25483 A1 | | 8/1996 | |
| WO | 2013/094357 A1 | | 6/2013 | |
| WO | 2017/042870 A1 | | 3/2017 | |
| WO | 2021/131924 A1 | | 7/2021 | |

OTHER PUBLICATIONS

Machine translation of JP 2011-254731, publication date: Dec. 22, 2011, pp. 1-20. (Year: 2011).*
Machine translation of JP 2016-149975, publication date Aug. 22, 2016, pp. 1-9. (Year: 2016).*
Boeck D. et al., Nucleobasen und Nucleoside in verschiedenen Sieren, Brauwissenschaft vol. 32, No. 6, , pp. 160-166, 1979, with patial English translation. (9 pages); cited in JP Office Action dated Feb. 27, 2024.
Cortacero-Ramirez S. et al., Direct multicomponent analysis of beer samples constituents using micellar electrokinetic capillary chromatography, Electrophoresis, vol. 25, pp. 1867-1871, 2004. (5 pages); cited in JP Office Action dated Feb. 27, 2024.
Yamamoto T. et al., Beer in Health and Disease Prevention, Purines in Beer, vol. 26, ISBN: 978-0-12-373891-2, pp. 286-290, 2009. (11 pages); cited in JP Office Action dated Feb. 27, 2024.
Dale C. et al., Quantitative Analysis of Purine Nucleosides and Free Bases in Wort and Beer, J. Inst. Brew., vol. 100, p. 173-178, 1994. (6 pages); cited in JP Office Action dated Feb. 27, 2024.
Montanari L. et al., Production of Alcohol-Free Beer, Beer in Health and Disease Prevention, vol. 6, ISBN: 978-0-12-373891-2, p. 62-75, 2009. (20 pages); cited in JP Office Action dated Feb. 27, 2024.
Chapter IV: Nitrogen-Containing Compounds, Ingredients of Brew, Brewing Society of Japan, pp. 196-201, Dec. 10, 1999, with partial English translation. (8 pages).; cited in JP Office Action dated Feb. 27, 2024.
Kokubu N., Chapter 3: Nitrogen-Containing Compounds, Journal of the Brewing Society of Japan, vol. 71, No. 9, p. 682-688, 1976, with partial English translation. (12 pages); cited in JP Office Action dated Feb. 27, 2024.
Jin B. et al., Structural Changes of Malt Proteins During Boiling, Molecules, vol. 14, p. 1081-1097, 2009, (17 pages); cited in JP Office Action dated Feb. 27, 2024.
Berner T. et al., The impact of different ale brewer's yeast strains on the proteome of immature beer, BMC Microbiology, p. 1-8, 2013. (8 pages); cited in JP Office Action dated Feb. 27, 2024.
C. Specker et al, "In vitro studies on the main beer protein 74 of Hordeum vulgare concerning heat stability, protease inhibition and gushing", J. Inst. Brew., 2014, vol. 120, pp. 85-92. (8 pages).
Niu et al., "Comparative analysis of the effect of protein Z4 from barley malt and recombinant Pichia pastoris on beer foam stability: Role of N-glycosylation and glycation", International Journal of Biological Macromolecules, 2018, vol. 106, pp. 241-247. (7 pages).

(Continued)

*Primary Examiner* — Jenna A Watts
(74) *Attorney, Agent, or Firm* — WHDA, LLP

(57) ABSTRACT

The present invention aims to provide a beverage with increased fullness. In particular, the present invention aims to provide a non-alcoholic beer-taste beverage with increased fullness. The present invention relates to, for example, a non-alcoholic beer-taste beverage containing adenosine at a concentration of 8 ppm or more.

12 Claims, No Drawings

(56) References Cited

OTHER PUBLICATIONS

Didier et al, "Soluble Proteins of Beer", Beer in Health and Disease Prevention, 2009, pp. 265-271. (10 pages).
Fontana et al, "Amino Acids in Beer", Beer in Health and Disease Prevention, 2009, pp. 273-284. (12 pages).

* cited by examiner

NON-ALCOHOLIC BEER TASTE BEVERAGE

TECHNICAL FIELD

The present invention relates to a non-alcoholic beer-taste beverage.

BACKGROUND ART

Diversification of consumer preferences in recent years has created a desire for development of non-alcoholic beer-taste beverages having various aroma and taste characteristics.

Patent Literature 1 discloses adding a peptide of a specific molecular weight to improve the aroma and taste of beer-taste beverages.

Recent years have seen a demand for non-alcoholic beer-taste beverages with alcohol sensation. For example, Patent Literatures 2 to 4 each disclose an increase in alcohol sensation in non-alcoholic beer-taste beverages by addition of a pungency imparting component or a sourness imparting component, and a bitterness imparting component. In these Patent Literatures 2 to 4, adenosine and its derivatives are disclosed as one type of bitterness imparting components.

CITATION LIST

Patent Literature

Patent Literature 1: JP 2016-149975 A
Patent Literature 2: WO 2013/094357
Patent Literature 3: JP 5746833 B
Patent Literature 4: JP 2015-27309 A

SUMMARY OF INVENTION

Technical Problem

In Patent Literature 1, beverages are evaluated using indexes including beer-like taste, smooth flow of the taste, and lingering roughness in the mouth. According to the literature, beverages with a high score on the sensory evaluation based on these indexes can be obtained when the beverages contain a 10-20 kDa peptide at a specific concentration.

According to Patent Literatures 2 to 4, a non-alcoholic beer-taste beverage with alcohol sensation can be obtained by adding a pungency imparting component or a sourness imparting component, and a bitterness imparting component.

Some people prefer a specific taste as the taste immediately after drinking a beer-taste beverage. The specific taste cannot be expressed by any of the five basic tastes, i.e., sweet, salty, sour, bitter, and umami, but is characterized by intensity, mouthfulness, thickness, persistence of the taste, or a good balance of intensity of the taste. Herein, such a characteristic is referred to as "fullness".

The beverages disclosed in Patent Literatures 1 to 4 still have room for further improvement in terms of fullness, and there has been a demand for a method of increasing the fullness of non-alcoholic beer-taste beverages.

The present invention aims to provide a beverage with increased fullness. In particular, the present invention aims to provide a non-alcoholic beer-taste beverage with increased fullness. A non-alcoholic beer-taste beverages tends to have poor fullness, so that increasing the fullness of such a beverage is particularly expected.

Solution to Problem

Specifically, the present invention relates to the following non-alcoholic beer-taste beverage.

(1) A non-alcoholic beer-taste beverage containing adenosine at a concentration of 8 ppm or more.

(2) The non-alcoholic beer-taste beverage according to (1) above, wherein the adenosine has a concentration of 8 to 20 ppm (3) The non-alcoholic beer-taste beverage according to (1) or (2) above, further containing a protein having a molecular weight of 35 to 50 kDa, wherein the protein has a concentration of 1 ppm or more.

(4) The non-alcoholic beer-taste beverage according to (3) above, wherein the protein has a concentration of 30 ppm or less.

(5) A non-alcoholic beer-taste beverage containing adenosine and a protein having a molecular weight of 35 to 50 kDa, wherein the adenosine has a concentration of 1 ppm or more and the protein has a concentration of 1 ppm or more.

(6) The non-alcoholic beer-taste beverage according to (5) above, wherein the protein has a concentration of 5 ppm or more.

Advantageous Effects of Invention

The present invention can provide a non-alcoholic beer-taste beverage with increased fullness.

DESCRIPTION OF EMBODIMENTS

The non-alcoholic beer-taste beverage of the present invention may contain malt in its ingredients or may not contain malt in its ingredients (the proportion by weight of malt in a mixture of ingredients is 0).

The term "ingredients" herein means grain ingredients and sugars other than hops and water.

Components that may be added in trace amounts, such as acidulants, sweeteners, bittering agents, seasonings, and flavorings are not included in the ingredients. When the ingredients include malt, the ingredients may include, in addition to the malt as an ingredient, rice, corn, sorghum, potato, starch, and cereal grains other than malt.

The amount of extract in the non-alcoholic beer-taste beverage of the present invention is not limited but is preferably 0.01 to 20.0 wt %.

The phrase "does not contain malt in its ingredients" means that the proportion by weight of malt in a mixture of ingredients is 0, wherein the ingredients include plant proteins such as malt, rice, corn, sorghum, potato, starch, and beans, cereal grains other than malt, and sugars but exclude water and hops. When the ingredients do not include malt, preferably, a degraded soybean protein is included as a main ingredient. When the ingredients do not include malt, use of a malt-derived protein having a molecular weight of 35 to 50 kDa (described later) is acceptable.

Preferably, the non-alcoholic beer-taste beverage of the present invention is not a dealcoholized beer-taste beverage. The dealcoholized beer-taste beverage is a non-alcoholic beer-taste produced by removing alcohol from a beer-taste beverage.

The non-alcoholic beer-taste beverage is a beer-taste beverage having an alcohol content of less than 1%, preferably one containing substantially no alcohol. The alcohol content may be 0%.

The beer-taste beverage is a beer-flavored carbonated beverage.

Beverages containing substantially no alcohol include beverages containing an undetectable trace amount of alcohol. Beverages having an alcohol content rounded to 0.0%, particularly those having an alcohol content rounded to 0.00%, are included in non-alcoholic beer-taste beverages. Examples of the non-alcoholic beer-taste beverage of the present invention include non-alcoholic beer-taste beverages and beer-taste soft drinks. The "alcohol content" here means the ethanol content, with aliphatic alcohols other than ethanol being excluded.

The alcohol content of the non-alcoholic beer-taste beverage of the present invention means the proportion (v/v %) of the alcohol in the beverage, and the alcohol content can be measured by any known method. For example, it can be measured using a vibrating density meter. Specifically, a beverage is filtered or sonicated to prepare a sample from which carbon dioxide has been removed. The sample is distilled over open fire to obtain a distillate. The density of the distillate at 15° C. is measured. The density is then converted to the alcohol content using an appendix "Table 2: Table of Conversion between Alcohol Content and Density (15° C.) or Specific Gravity (15/15° C.)" of the Official Analysis Method of National Tax Agency of Japan (National Tax Agency Directive No. 6 in 2007, revised on Jun. 22, 2007). When the alcohol content is less than 1.0%, a commercially available alcohol measuring instrument or a gas chromatograph may be used.

The non-alcoholic beer-taste beverage of the present invention contains adenosine that is a type of nucleoside consisting of ribose and adenine.

The adenosine does not include adenosine derivatives such as 5'-deoxyadenosine.

In the non-alcoholic beer-taste beverage of the present invention, adenosine has a concentration of 8 ppm or more.

A non-alcoholic beer-taste beverage containing adenosine at a concentration of 8 ppm or more can have increased fullness. The correlation between the presence of adenosine at a predetermined concentration in a non-alcoholic beer-taste beverage and the fullness of the non-alcoholic beer-taste beverage was unknown so far and was found by the present inventors.

In the non-alcoholic beer-taste beverage of the present invention, preferably, adenosine has a concentration of 20 ppm or less.

It is because the beverage may taste pungency when the concentration of adenosine is too high.

In one embodiment, preferably, the concentration of adenosine in the non-alcoholic beer-taste beverage is 8 to 20 ppm.

Preferably, in the non-alcoholic beer-taste beverage of the present invention, the concentration of purine is less than 5 mg/100 mL. Herein, the purine is not limited as long as it is a compound having a purine nucleus structure. Thus, examples of the purine include purine bases (adenine, guanine, xanthine, hypoxanthine), purine nucleosides (adenosine, guanosine, inosine), purine nucleotides (adenylic acid, guanylic acid, inosinic acid), and low or high molecular weight nucleic acids (oligonucleotides, polynucleotides).

Herein, the term "concentration of purine" refers to the total amount of four purine bases including adenine, guanine, xanthine, and hypoxanthine. Purines can be measured by a known method, such as one that detects purines using liquid chromatography-mass spectrometry (LC-MS/MS) after hydrolysis with perchloric acid (see "Guide to trace analysis of purines in alcoholic beverages", Japan Food Research Laboratories, URL: http://www.jfrl.or.jp/item/nutrition/post-31.html).

Preferably, the non-alcoholic beer-taste beverage of the present invention further contains a protein having a molecular weight of 35 to 50 kDa, and the protein has a concentration of 1 ppm or more.

The protein having a molecular weight of 35 to 50 kDa is a protein detected in the molecular weight range of 35 to 50 kDa when the non-alcoholic beer-taste beverage is subjected to electrophoresis by SDS-PAGE. Before subjecting the non-alcoholic beer-taste beverage to electrophoresis by SDS-PAGE, for example, the non-alcoholic beer-taste beverage may be subjected to ultrafiltration using a 30 kDa cutoff membrane as a pre-treatment.

The protein is preferably a protein having a molecular weight of 35 to 45 kDa, more preferably a protein having a molecular weight of about 40 kDa. Herein, the protein having a molecular weight of 35 to 50 kDa is also referred to as a "40 kDa protein".

Preferably, the 40 kDa protein is a grain-derived protein.

Preferably, the grain is at least one selected from the group consisting of barley, wheat, corn, rice, and soybean.

When the grain is a cereal grain, the non-alcoholic beer-taste beverage can contain a protein derived from a known cereal grain usable in production of non-alcoholic beer-taste beverages. Examples of the cereal grain include barley, wheat, rye, common wild oat (*Avena fatua*), and common oat (*Avena sativa*). Preferred is barley. Further, the cereal grain may be either germinated or ungerminated, but is preferably malt from a germinated cereal grain. Any of these may be present alone or in combination of two or more in the non-alcoholic beer-taste beverage.

The 40 kDa protein is preferably Serpin Z4 (also known as: BSZ4, HorvuZ4, Major endosperm albumin, or Protein Z) derived from barley (scientific name: *Hordeum vulgare*) and/or Serpin Z7 (also known as: BSZ7 or HorvuZ7) derived from barley. The above protein may be a protein having an amino acid sequence in which one or more amino acids are deleted, replaced, inserted, and/or added.

Further adding a 40 kDa protein in addition to adenosine can further increase the fullness of the non-alcoholic beer-taste beverage.

Preferably, the concentration of the 40 kDa protein is 1 ppm or more, more preferably 3 ppm or more, still more preferably 5 ppm or more, and is preferably 30 ppm or less.

In one embodiment, the concentration of the 40 kDa protein in the non-alcoholic beer-taste beverage is preferably 1 ppm or more and 30 ppm or less, more preferably 3 ppm or more and 30 ppm or less, still more preferably 5 ppm or more and 30 ppm or less.

When the non-alcoholic beer-taste beverage contains both adenosine and a 40 kDa protein, the fullness of the non-alcoholic beer-taste beverage can be effectively increased by synergy of the adenosine and the 40 kDa protein. Thus, the lower limit of the concentration of the adenosine required for increasing the fullness may be low, or the lower limit of the concentration of the 40 kDa protein may be low.

In other words, according to another embodiment, the non-alcoholic beer-taste beverage of the present invention is a non-alcoholic beer-taste beverage containing adenosine and a protein having a molecular weight of 35 to 50 kDa, wherein the adenosine has a concentration of 1 ppm or more and the protein has a concentration of 1 ppm or more. The concentration of the protein is preferably 3 ppm or more, more preferably 5 ppm or more.

Preferably, the non-alcoholic beer-taste beverage of the present invention contains adenosine and a protein having a molecular weight of 35 to 50 kDa, wherein the adenosine has a concentration of 3 ppm or more and the protein has a concentration of 5 ppm or more. In the non-alcoholic beer-taste beverage of the present invention, the concentration of the protein is preferably 30 ppm or less. The concentration of the adenosine is preferably 20 ppm or less.

A common process of producing a non-alcoholic beer-taste beverage is described below.

A non-alcoholic beer-taste beverage can be easily produced because no fermentation step with yeast is involved.

In production of non-alcoholic beer-taste beverages produced using malt as an ingredient, a mixture containing water, cereal grains (e.g., malt), and other optional ingredients such as other grains, starch, sugars, bittering agents, and colorants is mixed with an enzyme such as an amylase as needed. The resulting mixture is gelatinized, saccharified, and filtered to obtain a saccharified solution. The saccharified solution is mixed with hops, a bittering agent, or the like as needed and then boiled, followed by removal of the solids content such as a coagulated protein in a clarification tank. The saccharified solution may be replaced by a boiled mixture of a malt extract, warm water, and hops. Hops may be added to the mixture at any stage from the start of boiling to the end of boiling. The conditions in the saccharification, boiling, solids content removal, and the like may be known conditions. After the boiling, the obtained wort is filtered, and the filtrate is then mixed with carbon dioxide gas. Thereafter, the resulting mixture is packaged in a container and sterilized to obtain a desired non-alcoholic beer-taste beverage.

In production of a non-alcoholic beer-taste beverage in which malt is not used as an ingredient, a liquid sugar containing a carbon source, a nitrogen source as an amino acid-containing material other than a cereal grain or malt, hops, colorants, and the like are mixed together with warm water to obtain a liquid sugar solution. The liquid sugar solution is boiled. When hops are used as an ingredient, the hops may be mixed into the liquid sugar solution during boiling, not before the start of boiling. The boiled liquid sugar solution is mixed with a carbon dioxide gas. Thereafter, the resulting mixture is packaged in a container and sterilized to obtain a desired non-alcoholic beer-taste beverage.

An aliphatic alcohol may be added to the non-alcoholic beer-taste beverage of the present invention to impart the alcohol-like texture to the beverage. The aliphatic alcohol may be any known aliphatic alcohol, but is preferably a C4-C5 aliphatic alcohol. Preferred aliphatic alcohols in the present invention include 2-methyl-1-propanol and 1-butanol as C4 aliphatic alcohols and 3-methyl-1-butanol, 1-pentanol, and 2-pentanol as C5 aliphatic alcohols. These can be used alone or in combination of two or more thereof.

The C4-C5 aliphatic alcohol content is preferably 0.0002 to 0.0007 wt %, more preferably 0.0003 to 0.0006 wt %. Herein, the aliphatic alcohol content can be measured by headspace gas chromatography.

The non-alcoholic beer-taste beverage of the present invention is preferably low in calories to suit the recent preference for low-calorie products. The non-alcoholic beer-taste beverage of the present invention therefore has a calorie content of preferably less than 5 kcal/100 mL, more preferably less than 4 kcal/100 mL, still more preferably less than 3 kcal/100 mL.

The calorie content of the non-alcoholic beer-taste beverage of the present invention is basically calculated in accordance with "Method for Analysis of Components such as Nutritional Components and the like under the Nutrition Labeling Standards" which was published in connection with the Health Promotion Act in Japan. In other words, in principle, the calorie content can be calculated as a sum of the products of the quantified amounts of the nutritional components multiplied by the energy conversion coefficients of the respective components (protein: 4 kcal/g; fat: 9 kcal/g; sugar: 4 kcal/g; dietary fiber: 2 kcal/g; alcohol: 7 kcal/g; organic acid: 3 kcal/g). The details are described in "Method for Analysis of Components such as Nutritional Components and the like under the Nutrition Labeling Standards".

The specific method of measuring the amount of each nutritional component contained in the non-alcoholic beer-taste beverage of the present invention may be in accordance with various analytical methods described in "Method for Analysis of Components such as Nutritional Components and the like under the Nutrition Labeling Standards" of the Health Promotion Act. Japan Food Research Laboratories can provide, upon request, data on the calorie contents and/or the amounts of nutritional components.

The sugar contained in the non-alcoholic beer-taste beverage of the present invention means a sugar based on the Nutrition Labeling Standards for Foods (Ministry of Health, Labor and Welfare, Notification No. 176, 2003). Specifically, the sugar refers to a component which remains after the protein, fat, dietary fiber, ash content, alcohol content, and moisture content are removed from a food. The amount of sugar in a food is calculated by subtracting the amounts of protein, fat, dietary fiber, ash content, and moisture content from the weight of the food. In this case, the amounts of protein, fat, dietary fiber, ash content, and moisture content are measured by the methods under the Nutrition Labeling Standards. Specifically, the amount of protein is measured by the nitrogen quantification conversion method. The amount of fat is measured by an ether extraction method, a chloroform-methanol liquid mixture extraction method, the Gerber method, an acid decomposition method, or the Roese-Gottlieb method. The amount of dietary fiber is measured by high performance liquid chromatography or the Prosky method. The amount of ash content is measured by a method of ashing with magnesium acetate, a direct ashing method, or a method of ashing with sulfuric acid. The amount of moisture content is measured by the Karl Fischer method, a method using a drying aid, a vacuum thermal drying method, an atmospheric thermal drying method, or a plastic film method.

The non-alcoholic beer-taste beverage of the present invention may be low in sugars to suit the recent preference for low-sugar food and beverages. The non-alcoholic beer-taste beverage of the present invention may have a sugar content of less than 2.5 g/100 mL or less than 0.5 g/100 mL. The lower limit is not particularly set, but is usually about 0.1 g/100 mL and may be, for example, 0.15 g/100 mL or more, or 0.2 g/100 mL or more.

The non-alcoholic beer-taste beverage of the present invention may contain an acidulant. The acidulant is preferably at least one acid selected from the group consisting of citric acid, lactic acid, phosphoric acid, and malic acid. In the present invention, an acid other than the acids above, such as succinic acid, tartaric acid, fumaric acid, or glacial acetic acid may also be used. Any of these can be used without limitation as long as they are accepted as food additives. In the present invention, preferred is a combination of lactic acid, which appropriately imparts a mild sour flavor, and phosphoric acid, which appropriately imparts a slightly tingling sour flavor.

The acidulant content in the non-alcoholic beer-taste beverage of the present invention in citric acid equivalent is preferably 200 ppm or more, more preferably 550 ppm or more, still more preferably 700 ppm or more to impart the beer-like taste. The acidulant content is preferably 15000 ppm or less, more preferably 5500 ppm or less, still more preferably 2000 ppm or less in terms of sour flavor. The acidulant content in the present invention in citric acid equivalent therefore falls within a range of 200 ppm to 15000 ppm, preferably 550 ppm to 5500 ppm, more preferably 700 ppm to 1500 ppm, for example. The "acidulant content in citric acid equivalent" is an amount calculated from the degree of the sour flavor of each acidulant based on the degree of the sour flavor of citric acid. For example, a lactic acid content of 100 ppm corresponds to a citric acid equivalent of 120 ppm. A phosphoric acid content of 100 ppm corresponds to a citric acid equivalent of 200 ppm. A malic acid content of 100 ppm corresponds to a citric acid equivalent of 125 ppm.

The acidulant content in a non-alcoholic beer-taste beverage refers to one calculated based on analysis by high performance liquid chromatography (HPLC) or the like.

In the non-alcoholic beer-taste beverage of the present invention, hops can be used as one of the ingredients.

When hops are used, hop pellets, hop powder, and hop extracts usually used in production of beer and the like can be appropriately selected according to the desired aroma and taste. Also, processed hop products such as isometric hops and reduced hops may be used. The hops used in the non-alcoholic beer-taste beverage of the present invention include these hops. The amount of hops to be added is not particularly limited, but is typically about 0.0001 to 1 wt % based on the total amount of the beverage.

The non-alcoholic beer-taste beverage of the present invention may contain any other ingredients as needed, as long as the effect of the present invention is not impaired. For example, sweeteners (including high-intensity sweeteners), bittering agents, flavorings, yeast extracts, colorants such as caramel color, plant-extracted saponin-based substances such as soybean saponin and quillaja saponin, substances containing proteins and peptides from plants such as corn and soybean, protein-based substances such as bovine serum albumin, seasonings such as dietary fiber and amino acids, and antioxidants such as ascorbic acid can be used as needed as long as the effect of the present invention is not impaired.

The non-alcoholic beer-taste beverage of the present invention can be packaged in a container. The form of the container is not limited. The non-alcoholic beer-taste beverage can be packed in a sealed container such as a bottle, can, keg, or plastic bottle, whereby a packaged beverage can be obtained.

The non-alcoholic beer-taste beverage of the present invention may be produced by any method, such as one in which a predetermined amount of adenosine is added to a non-alcoholic beer-taste beverage.

Preferably, a 40 kDa protein is added to the non-alcoholic beer-taste beverage.

The adenosine and the 40 kDa protein to be added can be prepared by, for example, a procedure described in Examples below.

The adenosine and the 40 kDa protein may be added in larger amounts by adjusting various conditions in the production process of the non-alcoholic beer-taste beverage.

EXAMPLES

Hereinafter, the present invention is specifically described with reference to examples, but the present invention is not limited to the following examples.

(Purification of Adenosine)

Adenosine was purified as described below.

(1) Fractionation of Beer by HP-20

Beer (60 L) was fractionated using 10 L Diaion® HP-20 (Mitsubishi Chemical Corporation). The HP-20 was washed with ethanol three times, and then washed with 50% ethanol three times before use. The washed HP-20 was packed in a mass fractionation column and replaced by water. The degassed beer (60 L) was mixed with the same amount of distilled water, and the resulting solution was introduced into the HP-20 column using a medium pressure pump. The solution that passed through the HP-20 column was obtained as a flow-through fraction. Distilled water (40 L) was introduced using a medium pressure pump, and an eluate was obtained as a water-eluted fraction. Likewise, hydrous ethanol (10% ethanol, 30% ethanol, and 70% ethanol) was introduced at an amount of 40 L for each concentration, and eluates were obtained as a 10% ethanol eluted fraction, a 30% ethanol eluted fraction, and a 70% ethanol eluted fraction. These eluted fractions were dried and refrigerated using an evaporator and a freeze dryer.

(2) LH-20 Fractionation of 10% Ethanol Eluted Fraction

The 10% ethanol eluted fraction among HP-20 fractions was fractionated using Sephadex® LH-20 (column volume: 500 mL). The ethanol-washed LH-20 was packed in a mass fractionation column and replaced by water. Then, the 10% ethanol eluted fraction (2.57 g) obtained by HP-20 fractionation was dissolved in distilled water and applied to the LH-20 column. Distilled water (1 L) was introduced, and water eluted fractions 1 to 5 were obtained. Subsequently, hydrous ethanol (35% ethanol, 70% ethanol, and 100% ethanol) was introduced at an amount of 1 L for each concentration, and eluates were obtained as a 35% ethanol eluted fraction, a 70% ethanol eluted fraction, and a 100% ethanol eluted fraction. These eluted fractions were dried and refrigerated using an evaporator and a freeze dryer.

(3) Isolation of Adenosine

The water eluted fraction 3 (82.4 mg) obtained by LH-20 fractionation was eluted with 10% ethanol using a HPLC (COSMOSIL 5C18-PAQ, 20×250 mm). Subsequently, an eluate from 5 min to 12 min was concentrated and eluted with a mixture with an ethanol/water concentration gradient (5:95→15:85) using an HPLC (COSMOSIL 5C18-PAQ, 20×250 mm), whereby a compound (I) (tR=18.5 min) was obtained.

The compound (I) was identified as adenosine from analysis of MS and NMR physical data and comparison with samples.

The following analytical instruments were used.
LC-MS: Q Exactive, Thermo Fisher Scientific
NMR: AVANCE 400, Bruker (Purification of 40 kDa Protein)

A 40 kDa protein was purified from commercially available beer (1 L) as follows.

(1) Fractionation by Cation Exchange Resin

A cation-exchange resin "SP Sepharose" (50 mL) was placed in an empty column. Beer was adsorbed onto the resin. Subsequently, the resin used for adsorption was transferred to another column, washed with a 20 mM sodium acetate buffer (pH 4.5), and then eluted with 20 mM sodium acetate (pH 4.5)+0.5 M-NaCl, whereby fractions were collected. The resulting fractions were evaluated by SDS- PAGE, and fractions containing a 40 kDa protein were collected as cation-exchange resin-bound fractions.
(2) Ultrafiltration (Buffer Exchange)

The cation-exchange resin-bound fractions obtained in (1) above were added in increments of 10 mL to an ultrafiltration unit (Amicon Ultra-15 30K, Merck KGaA) washed with water, and centrifuged at 3500 rpm and ultrafiltered, whereby a concentrate was obtained.
(3) Ammonium Sulfate Fractionation The concentrate obtained in (2) above was dropped into a beaker charged with a 20 mM phosphate buffer (pH 7.0) and 2 M ammonium sulfate, followed by stirring. The resulting suspension was then centrifuged (2330 g, 10 min, room temperature). The supernatant was collected in a different container. The collected solution was concentrated using an ultrafiltration unit. To the concentrate was added 20 mM sodium acetate (pH 4.5), followed by centrifugation (2330 g, 10 min, room temperature) for concentration, so that a purified 40 kDa protein product (quantified by the Bradford assay (in bovine serum albumin (BSA) equivalent), 20.4 mg/mL, 2.21 mL) was obtained. The purity of the resulting purified 40 kDa protein was confirmed by SDS-PAGE.

After the 40 kDa protein was digested by an enzyme, identification of the protein was attempted by LC-MS/MS analysis.

The band around 40 kDa isolated by SDS-PAGE was sliced, followed by reduction with dithiothreitol (56° C., 1 hr) and carbamide methylation with iodoacetamide (room temperature under light-shielded conditions, 45 min). Then, a 0.01% ProteaseMAX-containing 10 ng/µL chymotrypsin solution (5 mM calcium chloride, 50 mM ammonium bicarbonate solution) (15 µL), 5 mM calcium chloride, and a 50 mM ammonium bicarbonate solution (15 µL) were added, followed by overnight incubation. Subsequently, the resulting enzyme digestion solution was collected. The collected solution was solidified by drying in vacuum, which was then re-dissolved in a 0.1% formic acid solution.

The resulting product was used for LC-MS/MS analysis.
(Measurement by LC-MS/MS)

LC-MS/MS measurement was performed under the following conditions.
Device used: direct flow type nano LC system "Easy-nLC 1000™" (Thermo Fisher Scientific)
Trap column: Acclaim PepMap® (Thermo Fisher Scientific)
Analysis column: Nano HPLC Capillary Column (Nikkyo Technos Co., Ltd.)
Liquid chromatograph mass spectrometer: Q Exactive Plus (Thermo Fisher Scientific)
Mobile phase: solvent A: 0.1% formic acid/water; solvent B: 0.1% formic acid/acetonitrile
Flow rate: 300 nL/min
Gradient: 0-40% B/0-30 min, 40-60% B/30-35 min, 60-90% B/35-37 min, 90% B/37-45 min
Amount introduced: 10 µL
Ionization mode: ESI Positive
Measurement range: MS1 (m/z 350-1750)
Data Dependent Scan Mode
(4) Analysis of Protein The protein was identified under the following conditions.
Search software: Proteome Discoverer 2.2.0.388 (Thermo Fisher Scientific)
Species: barley (*Hordeum vulgare*), hop (*Humulus*), yeast (*Saccharomyces cerevisiae*)
Search Conditions:
Digestive enzyme: Chymotrypsin
Precursor ion mass error range: Monoisotopic, ±10 ppm
Product ion mass error range: ±0.02 Da
Maximum number of missed cleavages: 5
Confidence level (Percolator): High (level with the highest confidence of the three levels of confidence)
Database: SwissProt As a result, the 40 kDa protein was found to be barley-derived Serpin Z4 (sequence coverage: 77.2%) and barley-derived Serpin Z7 (sequence coverage: 72.8%).
(Sensory Evaluation of Commercially Available Non-Alcoholic Beer-Taste Beverage to which Adenosine is Added)

Adenosine was added to a commercially available non-alcoholic beer-taste beverage for sensory evaluation of the fullness.

The non-alcoholic beer-taste beverage is a non-alcoholic beer-taste beverage containing malt in its ingredients.

Raw materials of the non-alcoholic beer-taste beverage include malt, hops, carbonic acid, flavorings, acidulants, caramel color, vitamin C, bittering agents, and sweeteners. The nutritional components per 100 ml include 0% alcohol content, 0 g protein, 0 g sugar, 0 to 0.1 g dietary fiber, and about 0 mg purine.

Reference points of sensory evaluation are as follows.

Five special panelists rated in increments of 0.05 points based on the following criteria, and the points were averaged.

The criteria for the intensity of fullness are as follows.
0 points: no fullness at all
1 point: slight fullness
2 points: definite fullness
3 points: very intense fullness The commercially available alcoholic beer-taste beverage of the same kind as the above-described commercially available non-alcoholic beer-taste beverage (the subject of evaluation) was provided as a reference alcoholic beer-taste beverage (I), and its fullness was given 0.5 points as the reference point. To the beer-taste beverage (I) was added 25 ppm of a 40 kDa protein and the concentration of the 40 kDa protein was adjusted to 25 ppm. The fullness of such a beverage was given 0.7 points.

The procedure for the sensory evaluation is as follows.
(1) The non-alcoholic beer-taste beverage is dispensed into vials at a volume of 1/10 (v/v) of the final volume.
(2) Adenosine is weighed out at a predetermined weight and added to each vial.
(3) The vials are sonicated for 30 seconds.
(4) The vials are left to stand at room temperature for 30 minutes.
(5) The non-alcoholic beer-taste beverage is filled up to the final volume.
(6) The non-alcoholic beer-taste beverage is dispensed and ingested for evaluation.
(Analysis of Commercially Available Non-Alcoholic Beer-Taste Beverage)

The concentration of the adenosine in the commercially available non-alcoholic beer-taste beverage used for the sensory evaluation was quantitated by LC-MS.
(1) Preparation of Samples and Calibration Curves The adenosine was diluted to the following concentrations and passed through a 0.22 µm filter before measurement.
Final concentration: 0.001 ppm, 0.025 ppm, 0.050 ppm, 0.100 ppm, 0.200 ppm, 0.300 ppm, 0.500 ppm, 0.750 ppm, and 1.000 ppm
(1 ppm=1 µg/mL)

A 5% (v/v) aqueous ethanol solution was used as a diluent.

The results of sample analysis were based on values measured at a dilution factor at which the measured values would fall in the range ($R^2>0.99$) maintaining the linearity of the calibration curve.

LC-MS measurement conditions are as follows.
LC-MS: X500R, AB Sciex Ltd.
Separation column: HSS T3 1.8 μm, 2.1×150 mm, Waters
Eluent:
Solvent A: 0.1% formic acid/water; solvent B: 0.1% formic acid/acetonitrile
Gradient: solvent A:solvent B=98:2→2:98 (27 min)
Amount introduced: 5 μL
Flow rate: 0.2 mL/min
Column oven: 40° C.
(MS)
Ionization mode: ESI Positive
Measurement range: MS1 (m/z 100-1000)
Data Independent Scan mode
Ion source temperature: 350° C.

(2) Preparation of Sample for Measurement from Commercially Available Non-Alcoholic Beer-Taste Beverage A commercially available non-alcoholic beer-taste beverage was degassed by sonication, appropriately diluted after air bubbles settled, and passed through a 0.22 μm filter before measurement.

A 5% (v/v) aqueous ethanol solution was used as a diluent.

The concentration of adenosine in the commercially available non-alcoholic beer-taste beverage was used as the control.

Example 1: Evaluation by Addition of Adenosine

The concentration of the adenosine was 0.7 ppm and the concentration of the 40 kDa protein was 0 ppm in the commercially available non-alcoholic beer-taste beverage (control).

Adenosine was added to the non-alcoholic beer-taste beverage such that the concentration of the adenosine would be 1 ppm, 3 ppm, 8 ppm, 14 ppm, and 20 ppm for sensory evaluation (sample 1, sample 3, sample 5, sample 7, and sample 8).

Table 1 shows the results of the sensory evaluation.

Example 2: Evaluation of Synergy of Adenosine and 40 kDa Protein

A 40 kDa protein and adenosine were added to a commercially available non-alcoholic beer-taste beverage (control) to adjust the concentration of the 40 kDa to 5 ppm and the concentration of the adenosine to 1 ppm, 3 ppm, and 8 ppm for sensory evaluation test (sample 2, sample 4, and sample 6). The 40 kDa protein was one purified above.

For comparison, an evaluation was also performed on a commercially available non-alcoholic beer-taste beverage to which only a 40 kDa protein was added at a concentration of 5 ppm (comparison sample 1).

Table 1 shows the results of the sensory evaluation.

TABLE 1

|  | Control | Comparison sample 1 | Sample 1 | Sample 2 | Sample 3 | Sample 4 | Sample 5 | Sample 6 | Sample 7 | Sample 8 |
|---|---|---|---|---|---|---|---|---|---|---|
| Adenosine concentration (ppm) | 0.7 | 0.7 | 1 | 1 | 3 | 3 | 8 | 8 | 14 | 20 |
| 40 kDa protein concentration (ppm) | 0 | 5 | 0 | 5 | 0 | 5 | 0 | 5 | 0 | 0 |
| Panelist A | 0.50 | 0.55 | 0.50 | 0.55 | 0.60 | 0.65 | 0.60 | 0.70 | 0.70 | 0.60 |
| Panelist B | 0.50 | 0.55 | 0.50 | 0.55 | 0.55 | 0.55 | 0.60 | 0.65 | 0.65 | 0.70 |
| Panelist C | 0.50 | 0.55 | 0.50 | 0.55 | 0.60 | 0.65 | 0.60 | 0.75 | 0.60 | 0.65 |
| Panelist D | 0.50 | 0.55 | 0.50 | 0.60 | 0.55 | 0.70 | 0.65 | 0.80 | 0.65 | 0.70 |
| Panelist E | 0.50 | 0.60 | 0.55 | 0.75 | 0.55 | 0.75 | 0.60 | 0.85 | 0.70 | 0.70 |
| Average of sensory evaluation | 0.50 | 0.56 | 0.51 | 0.60 | 0.57 | 0.66 | 0.61 | 0.75 | 0.66 | 0.67 |

Example 3: Evaluation of Synergy of Adenosine and 40 kDa Protein

A 40 kDa protein and adenosine were added to a commercially available non-alcoholic beer-taste beverage (control) such that the concentration of the 40 kDa protein would be 1 ppm and the concentration of the adenosine would be 3 ppm for sensory evaluation test (sample 9).

The 40 kDa protein was one purified above.

For comparison, an evaluation was also performed on a commercially available non-alcoholic beer-taste beverage (control) to which only a 40 kDa protein was added at a concentration of 1 ppm (comparison sample 2). Table 2 shows the results of the sensory evaluation. Table 2 also shows the results of the sensory evaluation of sample 3 in Example 1.

TABLE 2

|  | Control | Sample 3 | Comparison sample 2 | Sample 9 |
|---|---|---|---|---|
| Adenosine concentration (ppm) | 0.7 | 3 | 0.7 | 3 |
| 40 kDa protein concentration (ppm) | 0 | 0 | 1 | 1 |
| Panelist A | 0.50 | 0.60 | 0.50 | 0.60 |
| Panelist B | 0.50 | 0.55 | 0.50 | 0.55 |
| Panelist C | 0.50 | 0.60 | 0.55 | 0.65 |
| Panelist D | 0.50 | 0.55 | 0.50 | 0.60 |
| Panelist E | 0.50 | 0.55 | 0.55 | 0.60 |
| Average of sensory evaluation | 0.50 | 0.57 | 0.52 | 0.60 |

The results of sample 1, sample 3, sample 5, sample 7, and sample 8 in Table 1 show that increasing the concentration of the adenosine in the non-alcoholic beer-taste beverage increased the fullness. When the concentration of the adenosine was 8 ppm or more, the average of the sensory evaluation was greater than the control (0.5 points) by 0.1 points or more, showing an effective increase in the fullness.

The results of the comparison samples 1 and 2 show that the fullness can be increased by simply adding a 40 kDa protein to the non-alcoholic beer-taste beverage. The results also show that, for example, the increment (0.1) from the control in the sensory evaluation of the sample 2 is greater than the additive effect (0.07) predictable from the combination of the adenosine and the 40 kDa protein as determined as the sum of the increment (0.01) from the control in the sensory evaluation of the sample 1 and the increment (0.06) from the control in the sensory evaluation of the comparison sample 1. The results also show that the increment (0.1) from the control in the sensory evaluation of the sample 9 is greater than the additive effect (0.09) predictable from the combination of the adenosine and the 40 kDa protein as determined as the sum of the increment (0.07) from the control in the sensory evaluation of the sample 3 and the increment (0.02) from the control in the sensory evaluation of the comparison sample 2. These results show that even when the concentration of the adenosine is lower than 8 ppm, the fullness is effectively increased by the combination of the adenosine at a concentration of 1 ppm or more and the 40 kDa protein at a concentration of 1 ppm or more. This indicates unpredictable synergy in increase in the fullness.

The results also show that the increment (0.16) from the control in the sensory evaluation of the sample 4 is greater than the additive effect (0.13) predictable from the combination of the adenosine and the 40 kDa protein as determined as the sum of the increment (0.07) from the control in the sensory evaluation of the sample 3 and the increment (0.06) from the control in the sensory evaluation of the comparison sample 1.

The results also show that the increment (0.25) from the control in the sensory evaluation of the sample 6 is greater than the additive synergy (0.17) predictable from the combination of the adenosine and the 40 kDa protein as determined as the sum of the increment (0.11) from the control in the sensory evaluation of the sample 5 and the increment (0.06) from the control in the sensory evaluation of the comparison sample 1.

These results indicate an effective increase in the fullness by the combination of the adenosine and the 40 kDa protein and unpredictable effect in increase in the fulness.

The non-alcoholic beer-taste beverage containing adenosine at a concentration of 20 ppm tasted pungency according to a panelist(s), so that preferred concentration of the adenosine is considered to be 20 ppm or less.

INDUSTRIAL APPLICABILITY

The present invention can provide a non-alcoholic beer-taste beverage with increased fullness.

The invention claimed is:

1. A non-alcoholic beer-taste beverage comprising adenosine at a concentration of 8 to 20 ppm.

2. The non-alcoholic beer-taste beverage according to claim 1, further containing a protein having a molecular weight of 35 to 50 kDa,
   wherein the protein is a protein derived from barley, and the protein has a concentration of 1 ppm or more.

3. The non-alcoholic beer-taste beverage according to claim 2,
   wherein the protein has a concentration of 30 ppm or less.

4. A non-alcoholic beer-taste beverage comprising:
   adenosine; and
   a protein having a molecular weight of 35 to 50 kDa and derived from barley,
   wherein the adenosine has a concentration of 8 to 20 ppm, and
   the protein has a concentration of 1 ppm or more.

5. The non-alcoholic beer-taste beverage according to claim 4,
   wherein the protein has a concentration of 5 ppm or more.

6. The non-alcoholic beer-taste beverage according to claim 1, further containing a protein having a molecular weight of 35 to 50 kDa,
   wherein the protein is a protein derived from barley, and the protein has a concentration of 1 ppm or more to 30 ppm.

7. The non-alcoholic beer-taste beverage according to claim 4,
   wherein the protein is Serpin Z4 derived from barley and/or Serpin Z7 derived from barley, and the protein has a concentration of 1 to 30 ppm.

8. The non-alcoholic beer-taste beverage according to claim 4,
   wherein the protein is Serpin Z4 derived from barley and/or Serpin Z7 derived from barley, and the protein has a concentration of 3 to 30 ppm.

9. The non-alcoholic beer-taste beverage according to claim 4,
   wherein the protein is Serpin Z4 derived from barley and/or Serpin Z7 derived from barley, and the protein has a concentration of 5 to 30 ppm.

10. The non-alcoholic beer-taste beverage according to claim 4,
    wherein the protein is Serpin Z4 derived from barley and/or Serpin Z7 derived from barley, and the protein has a concentration of 5 to 30 ppm.

11. The non-alcoholic beer-taste beverage according to claim 1,
    wherein the non-alcoholic beer-taste beverage does not include adenosine derivatives.

12. The non-alcoholic beer-taste beverage according to claim 4,
    wherein the non-alcoholic beer-taste beverage does not include adenosine derivatives.

* * * * *